(12) United States Patent
Nada

(10) Patent No.: US 10,556,580 B2
(45) Date of Patent: Feb. 11, 2020

(54) SIGNAL PROCESSING METHOD, SLIP DETECTION METHOD, CONTROL METHOD FOR VEHICLE, CONTROLLER FOR VEHICLE, AND VEHICLE

(71) Applicant: TOYOTA JIDOSHA KABUSHIKI KAISHA, Toyota-shi, Aichi-ken (JP)

(72) Inventor: Mitsuhiro Nada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 24 days.

(21) Appl. No.: 16/018,407

(22) Filed: Jun. 26, 2018

(65) Prior Publication Data

US 2019/0001953 A1 Jan. 3, 2019

(30) Foreign Application Priority Data

Jun. 29, 2017 (JP) .................. 2017-127124

(51) Int. Cl.
*B60W 10/12* (2012.01)
*B60K 23/04* (2006.01)
*B60K 28/16* (2006.01)
*B60W 40/12* (2012.01)

(52) U.S. Cl.
CPC ............ *B60W 10/12* (2013.01); *B60K 23/04* (2013.01); *B60K 28/16* (2013.01); *B60W 40/12* (2013.01); *B60W 2510/125* (2013.01); *B60W 2720/30* (2013.01)

(58) Field of Classification Search
CPC ................. B60W 10/12; B60W 40/12; B60W 2510/125; B60W 2720/30; B60W 50/00; B60W 2050/0059; B60K 23/04; B60K 28/16
See application file for complete search history.

(56) References Cited

U.S. PATENT DOCUMENTS

| 7,500,534 B2 | 3/2009 | Hommi |
| 9,638,509 B2 * | 5/2017 | Takaki ..................... G01B 7/30 |
| 2009/0105909 A1 | 4/2009 | Yamaguchi |

FOREIGN PATENT DOCUMENTS

JP  2009-98094  5/2009

* cited by examiner

*Primary Examiner* — Rodney A Butler
(74) *Attorney, Agent, or Firm* — Finnegan, Henderson, Farabow, Garrett & Dunner, LLP

(57) ABSTRACT

Signals including noise at a constant interval are processed by receiving a signal as a result of detection by a sensor and sampling the received signal at an interval shorter than the interval of the noise; extracting a plurality of the sampled signals at an interval that is half of the interval of the noise; calculating an arithmetic mean value on a group of the extracted signals; and outputting a new signal being generated with the arithmetic mean value.

12 Claims, 7 Drawing Sheets

Fig.3

| COLUMN1 | COLUMN2 | COLUMN3 | COLUMN4 | COLUMN5 | COLUMN6 | COLUMN7 |
|---|---|---|---|---|---|---|
| MEASUREMENT TIME | SPEED | TIME CONSTANT SPEED | ARITHMETIC MEAN SPEED | ACCELERATION OF Vlpfav | TIME CONSTANT ACCELERATION | ACCELERATION OF V |
| Time [msec] | V [m/s] | Vsm [m/s] | Vlpfav [m/s] | Aav [m/s$^2$] | Asm [m/s$^2$] | A [m/s$^2$] |
| 0 | 0 | 0 | | | | 0 |
| 10 | 0.006 | 0.00120 | | | | 0.6 |
| 20 | 0.006 | 0.00216 | | | | 0 |
| 30 | 0.018 | 0.00533 | | | | 1.2 |
| 40 | 0.018 | 0.00786 | | | | 0 |
| 50 | 0.018 | 0.00989 | | | | 0 |
| 60 | 0.031 | 0.01411 | | | | 1.3 |
| 70 | 0.037 | 0.01869 | | | | 0.6 |
| 80 | 0.037 | 0.02235 | | | | 0 |
| 90 | 0.037 | 0.02528 | | | | 0 |
| 100 | 0.037 | 0.02763 | | | | 0 |
| 110 | 0.049 | 0.03190 | | | | 1.2 |
| 120 | 0.049 | 0.03532 | | | | 0 |
| 130 | 0.055 | 0.03926 | | | | 0.6 |
| 140 | 0.049 | 0.04120 | | | | -0.6 |
| 150 | 0.055 | 0.04396 | | | | 0.6 |
| 160 | 0.055 | 0.04617 | | | | 0 |
| 170 | 0.061 | 0.04914 | | | | 0.6 |
| 180 | 0.068 | 0.05231 | 0.025585365 | 0 | 0 | 0.7 |
| 190 | 0.061 | 0.05453 | 0.028418292 | 0.283292692 | 0.047215449 | -0.7 |
| 200 | 0.061 | 0.05582 | 0.030384634 | 0.196634153 | 0.072118566 | 0 |
| 210 | 0.068 | 0.05826 | 0.033207707 | 0.282307323 | 0.107150026 | 0.7 |
| 220 | 0.074 | 0.06141 | 0.035766166 | 0.255845858 | 0.131932664 | 0.6 |
| 230 | 0.08 | 0.06512 | 0.039012933 | 0.324676687 | 0.164056668 | 0.6 |
| ⋮ | ⋮ | ⋮ | ⋮ | ⋮ | ⋮ | ⋮ | ern
SIGNAL PROCESSING METHOD, SLIP DETECTION METHOD, CONTROL METHOD FOR VEHICLE, CONTROLLER FOR VEHICLE, AND VEHICLE

CROSS REFERENCE TO RELATED APPLICATION

The present application claims priority from Japanese patent application 2017-127124 filed on Jun. 29, 2017, the entirety of the content of which is hereby incorporated by reference into this application.

BACKGROUND

Field

The present disclosure relates to a processing method for signals including noise at a constant interval, a slip detection method, a control method for a vehicle, a controller for a vehicle, and a vehicle.

Related Art

Abnormality of a measurement target may be detected by calculating a moving average value of signals obtained from a sensor. JP-A-2009-98094 describes a method of calculating a moving average value of angles obtained by a sensor provided to a rotor gear integrated with a steering shaft, and detecting abnormality of the gear by using the moving average value calculated.

Noise can be expected to be removed from a signal by calculating the moving average value of the signal. Unfortunately, simple calculation of the moving average value, resulting in obtained signals being averaged, involves a risk that a peak of signals due to sharp signal change might fail to be detected at the actual peak timing.

SUMMARY

The present disclosure is made to at least partially solve the problem described above, and can be implemented as the following aspects.

According to an aspect of the present disclosure, a method of processing a signal including noise at a constant interval is provided. The method comprises receiving a signal as a result of detection by a sensor and sampling the received signal at an interval shorter than the interval of the noise; extracting a plurality of the sampled signals at an interval that is half of the interval of the noise; calculating an arithmetic mean value on a group of the extracted signals; and outputting a new signal being generated with the arithmetic mean value.

With this method, a plurality of signals sampled at an interval shorter than the interval of the noise are extracted at an interval that is half of the interval of the noise, and the arithmetic mean processing is executed on the signals. Thus, when the signal suddenly changes, the peak of the signal that has changed can be detected without delay, while simultaneously implementing detection of the signal by the sensor and noise removal.

The present disclosure can be implemented in various aspects other than the method and the controller described above. For example, the present disclosure may be implemented as an aspect of a computer program for implementing a signal processing method and a vehicle control method, a non-transitory storage medium storing the computer program, a signal processing device that implements the signal processing method, a vehicle including the signal processing device, a vehicle including a vehicle controller, and the like.

BRIEF DESCRIPTION OF DRAWINGS

FIG. 3 is a table illustrating speed and the like calculated by the controller at each measurement time.

DESCRIPTION OF EMBODIMENTS

Figure 1:
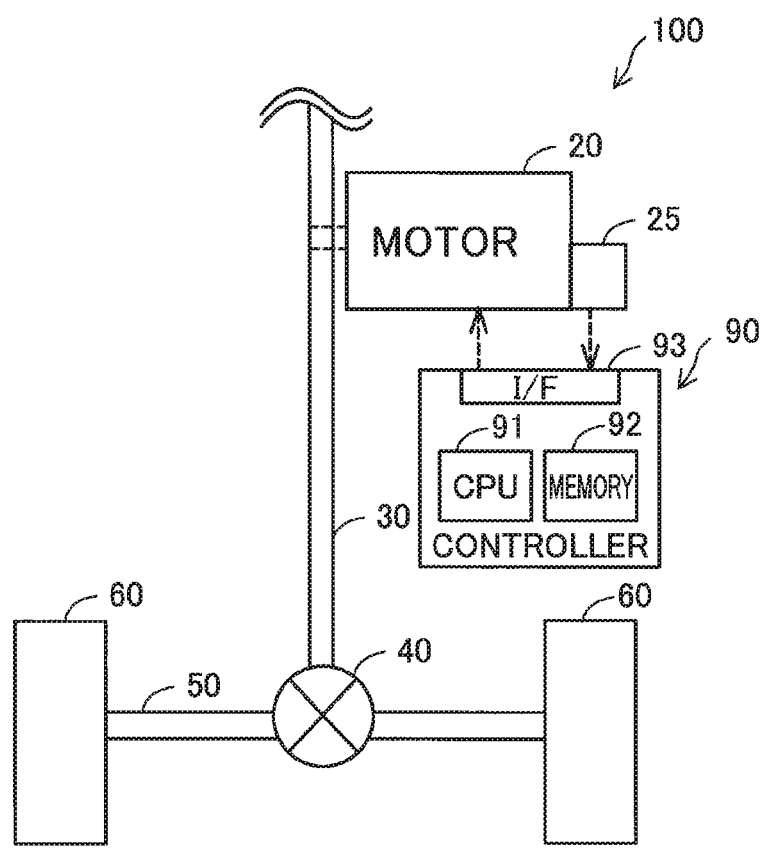
FIG. 1 is a schematic configuration diagram illustrating a part of a vehicle.

FIG. 1 is a schematic configuration diagram illustrating a part of a vehicle 100. The vehicle 100 uses driving force generated by a motor 20 to drive rear wheels 60.

The driving force from the motor 20 is output to a propeller shaft 30 through a transmission (not illustrated). The propeller shaft 30 connects a differential gear 40 and the transmission to each other. When the driving force from the propeller shaft 30 is input to the differential gear 40, the rear wheels 60 are driven via a driving shaft 50. The differential gear 40 is also referred to as a "gear unit". A unit, including the motor 20 and the differential gear 40, for driving the vehicle 100 is also referred to as a "driving system" for the vehicle 100.

The motor 20 is provided with a resolver 25. The resolver 25 detects a rotational angle of a rotor in the motor 20, and transmits the rotational angle to a controller 90. A signal, including the rotational angle detected by the resolver 25, further includes noise at a constant interval, due to torsion of the propeller shaft 30 and backlash in a connection portion between the propeller shaft 30 and the differential gear 40. The signal including the rotational angle may further include an irregular frequency component, different from the noise at a constant interval, due to variation of the rotation of the motor 20 or the like.

The controller 90 includes a microcomputer including a central processing unit (CPU) 91 and a memory 92, and functions as a signal processing device that processes the detection signal from the resolver 25, with the CPU 91 executing a program stored in the memory 92. The controller 90 receives the rotational angle in the detection signal from the resolver 25 via an interface 93. In the present embodiment, the controller 90 converts a value (angular velocity), obtained by differentiating the rotational angle received, into rotational speed of the motor 20. The controller 90 uses the rotational speed of the motor 20 to calculate speed, and differentiates the speed to calculate acceleration. The controller 90 may differentiate the rotational angle received to calculate the angular velocity, and differentiate the angular velocity to calculate angular acceleration.

Figure 2:
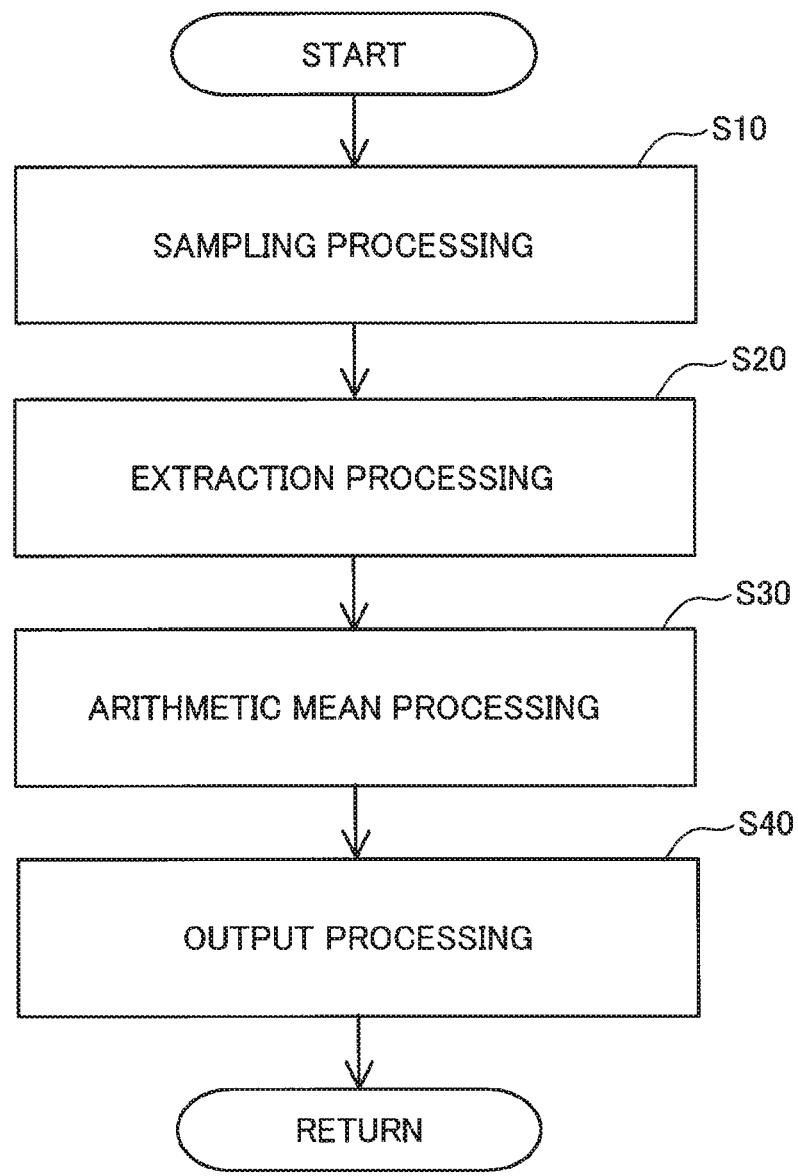
FIG. 2 is a flowchart illustrating a signal processing method performed by a controller.

FIG. 2 is a flowchart illustrating signal processing executed by the controller 90. Signal processing according to a first embodiment is described with reference to FIG. 2. The controller 90 receives the detection signal from the resolver 25, and executes sampling processing to perform sampling on the received signal at an interval shorter than the interval of the noise (step S10). The interval of the noise and the sampling interval are stored in the memory 92 of the controller 90 in advance.

The controller 90 executes extraction processing of extracting a plurality of signal values, from a group of signal values sampled at an interval shorter than the interval of the noise, at an interval that is half of the interval of the noise, that is, at a half interval relative to the noise interval (step S20). The extraction processing may not be executed at an interval exactly matching the half interval, and may be an interval within a range of approximately ±10% of the half interval. The number of signal values extracted is an even number that is at least two and is preferably be four or six considering a balance between the processing time and the accuracy. The number of signal values may also be eight or more. The extraction processing may include extracting a plurality of groups of an even number of signal values. The groups may be each extracted at the half interval relative to the noise interval from an appropriate starting point. The starting points of the groups may be shifted from each other, that is, provided with different offset values.

The controller 90 executes arithmetic mean processing of calculating an arithmetic mean value for each group including the extracted signal values (step S30). The arithmetic mean processing according to the present embodiment is executed by obtaining a simple arithmetic mean value of an even number of a plurality of signal values extracted. The signal may include noise at a predetermined interval, that is, sine wave noise. In such a case, sampling signal values may be extracted at even number points at an interval that is half of the interval of the noise. This results in positive and negative noise amplitude values that are approximately the same (positive and negative noise amplitude values with approximately the same absolute value). Thus, a small arithmetic mean value is obtained, whereby the noise component can be reduced or substantially removed from the signal.

The controller 90 executes output processing of outputting a value obtained through the arithmetic mean processing for each group, as a new signal (step S40).

The signal processing method according to the first embodiment described above includes extracting a plurality of signal values from a group of signal values, sampled from the detection signal, at an interval that is half of the noise interval, calculating the arithmetic mean value of the signal values, and outputting the resultant value as a new signal. Thus, signal detection by the sensor and noise removal can be implemented at the same time. Thus, the noise component can be reduced or substantially removed easily from a target signal, with a minimum possible phase delay. All things considered, when a signal sharply changes, the peak of the changed signal can be detected without delay.

A signal processing method according to a second embodiment is described below based on a more specific example. In the description with reference to FIG. 2, matters that have been described in the first embodiment will be omitted. The controller 90 receives a detection signal from the resolver 25 and executes sampling processing of sampling the received signal at an interval shorter than that of the noise (step S10 in FIG. 2). In the present embodiment, the frequency of the noise is 8.33 (Hz) and the interval of the noise is 120 (ms). The controller 90 samples the detection signal from the resolver 25 at an interval of 10 (ms), which is shorter than that of the noise, to calculate a speed V (m/s).

FIG. 3 is a table illustrating the speed V and the like calculated by the controller 90 at each measurement time. Columns 1 and 2 in FIG. 3 respectively correspond to a measurement time interval (sampling interval) and the speed V (m/s).

In the present embodiment, the controller 90 executes time constant processing on the speed V, as in the following Formula (1), to calculate time constant speed Vsm (m/s). A column 3 in FIG. 3 corresponds to the time constant speed Vsm. In this specification, "*" represents multiplication.
[kiso-0029

$$Vsm[i]=Vsm[i-1]+(V[i]-Vsm[i-1])*\text{calculation interval}/(\Delta t+\alpha) \quad \text{Formula (1)}$$

In the formula, ($\Delta t+\alpha$) represents a time constant that is not necessarily the same as a noise interval, $\Delta t$ represents the noise interval, i represents an integer that is equal to or larger than 1, the calculation interval represents the sampling interval, and $\alpha$ represents a value that is equal to or larger than zero. The value $\alpha$ can be changed as appropriate in accordance with the signal. In the present embodiment, $\alpha$ is 10 and the time constant is 130 (ms).

Next, the controller 90 executes extraction processing of extracting a plurality of signals, sampled at the interval shorter than that of the noise, at an interval that is half of the interval of the noise, that is, half of the noise interval (step S20, in FIG. 2). In the extraction processing, the controller 90 extracts the signals at the interval that is half of the interval of the noise, in such a manner that a plurality of groups are extracted with the detection time of the sensor associated with each signal in one extracted group is shifted from the detection time of the sensor associated with a corresponding signal in the previously extracted group.

In the example illustrated in FIG. 3, the controller 90 extracts even number of time constant speeds Vsm, that is, for example, four time constant speeds Vsm for each group, at an interval of 60 ms that is half of the interval 120 ms of the noise.

Thus, the controller 90 extracts groups including: a group of time constant speeds Vsm measured at measurement times of 0, 60, 120, and 180 (ms);

a group of time constant speeds Vsm measured at measurement times of 10, 70, 130, and 190 (ms);

a group of time constant speeds Vsm measured at measurement times of 20, 80, 140, and 200 (ms);

a group of time constant speeds Vsm measured at measurement times of 30, 90, 150, and 210 (ms);

a group of time constant speeds Vsm measured at measurement times of 40, 100, 160, and 220 (ms);

a group of time constant speeds Vsm measured at measurement times of 50, 110, 170, and 230 (ms);

and so on.

The controller 90 executes the arithmetic mean processing of calculating an arithmetic mean value for each group including the extracted signals (step S30 in FIG. 2). The arithmetic mean processing according to the present embodiment is executed by obtaining a simple arithmetic mean value of the even number of time constant speeds Vsm in each group extracted. Upon receiving the signal from the resolver 25, the controller 90 executes the sampling, calculation of the speed V, calculation of the time constant speed Vsm, and the extraction processing for the time constant speed Vsm as described above. An arithmetic mean speed Vlpfav is obtained based on Vsm in each group. In the example illustrated in FIG. 3, the arithmetic mean speed Vlpfav is calculated with the following Formula (2) after the time constant speeds Vsm at the marked measurement times of 0, 60, 120, and 180 (ms) have been obtained.

$$Xlfp\,[0] = (Xsm[0 + \Delta t/\Delta ts * 0] + Xsm[0 + \Delta t/\Delta ts * 1] +$$
$$Xsm[0 + \Delta t/\Delta ts * 2] + Xsm[0 + \Delta t/\Delta ts * 3])/4$$
$$Xlfp\,[1] = (Xsm[1 + \Delta t/\Delta ts * 0] + Xsm[1 + \Delta t/\Delta ts * 1] +$$
$$Xsm[1 + \Delta t/\Delta ts * 2] + Xsm[1 + \Delta t/\Delta ts * 3])/4$$
$$Xlfp\,[2] = (Xsm[2 + \Delta t/\Delta ts * 0] + Xsm[2 + \Delta t/\Delta ts * 1] +$$
$$Xsm[2 + \Delta t/\Delta ts * 2] + Xsm[2 + \Delta t/\Delta ts * 3])/4$$
$$Xlfp\,[3] = (Xsm[3 + \Delta t/\Delta ts * 0] + Xsm[3 + \Delta t/\Delta ts * 1] +$$
$$Xsm[3 + \Delta t/\Delta ts * 2] + Xsm[3 + \Delta t/\Delta ts * 3])/4$$
$$\vdots$$
$$Xlfp\,[n] = (Xsm[n + \Delta t/\Delta ts * 0] + Xsm[n + \Delta t/\Delta ts * 1] +$$
$$Xsm[n + \Delta t/\Delta ts * 2] + Xsm[n + \Delta t/\Delta ts * 3])/4$$

Formula (2)

In the formula, Xlfp[n] represents the arithmetic mean (Vlpfav), $\Delta t$ represents an interval that is half of the noise interval, $\Delta ts$ represents a sampling interval, and n presents an integer that is equal to or larger than zero. Formula (2) represents a calculation in a configuration where each group includes four pieces of data. However, the number of data pieces in a single group is not limited to four, and may be any even number. Specifically, the number is at least two, and is preferably six considering the balance between the processing time and the accuracy. Still, the number may be eight or more. Formula (2) may be changed in accordance with the number of pieces of data in a single group.

Next, the controller 90 executes the output processing of outputting the value, obtained by the arithmetic mean processing, as a new signal (step S40 in FIG. 2). In the present embodiment, the controller 90 uses the following Formula (3) to calculate acceleration Aav (m/s²) based on the arithmetic mean speed Vlpfav. Then, the controller 90 uses the following Formula (4) to execute the time constant processing on the acceleration Aav to calculate time constant acceleration Asm (m/s²). The "new signal" includes the arithmetic mean speed Vlpfav, the acceleration Aav calculated based on the arithmetic mean, and the time constant acceleration Asm. Columns 4, 5, and 6 in FIG. 3 respectively correspond to the arithmetic mean speed Vlpfav, the acceleration Aav, and the time constant acceleration Asm.

$$Aav[i]=(Vlpfav[i]-Vlpfav[i-1])/\text{calculation interval} \quad \text{Formula (3)}$$

$$Asm[i]=Asm[i-1]+(Aav[i]-Asm[i-1])*\text{calculation interval}/(\Delta t+\beta) \quad \text{Formula (4)}$$

In the formulae, $(\Delta t+\beta)$ represents the time constant that is not necessarily the same as a noise interval, $\Delta t$ represents the noise interval, and $\beta$ represents a value that is equal to or larger than zero. The value $\beta$ can be changed as appropriate in accordance with the signal and may not be the same value as $\alpha$ in the Formula (1) described above. In the present embodiment, $\beta$ is 0, and the time constant is 120 (ms).

The acceleration Aav and the time constant acceleration Asm can be calculated after all of the extraction target signals have been obtained, as in the case of the arithmetic mean speed Vlpfav. In the method described above, the controller 90 repeats the series of processes described above to output the arithmetic mean speed Vlpfav, the acceleration Aav, and the time constant acceleration Asm, each time the signals in a single group are obtained.

Effects obtained by executing the extraction processing at an interval that is approximately half of the noise interval and calculating the arithmetic mean value in each group as described above are described below.

Figure 4:
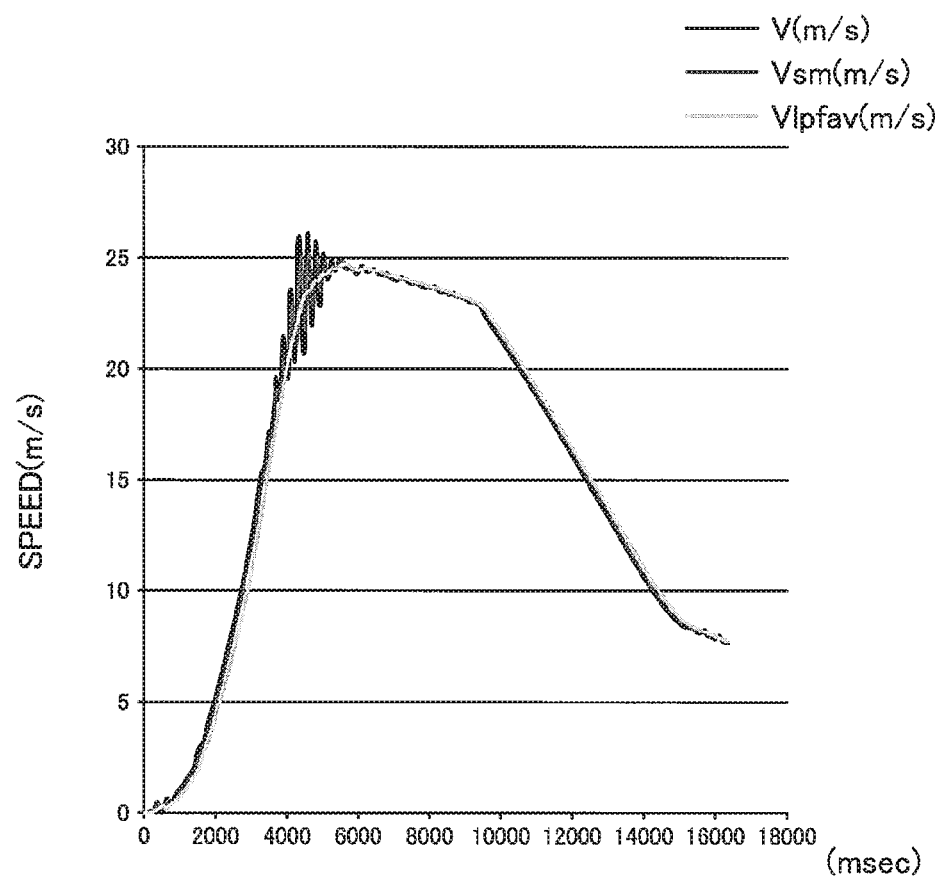
FIG. 4 is a diagram illustrating comparison among a speed V, a time constant speed Vsm, and an arithmetic mean speed Vlpfav.

FIG. 4 is a diagram illustrating comparison among the speed V, the time constant speed Vsm, and the arithmetic mean speed Vlpfav. In FIG. 4, the vertical axis represents speed and the horizontal axis represents measurement time. The time constant speed Vsm involves a smaller noise than the speed V due to the time constant processing. The arithmetic mean speed Vlpfav involves even smaller noise than the time constant speed Vsm. The reduction is even more significant for acceleration that is a value obtained by differentiating the speed.

Figure 5:
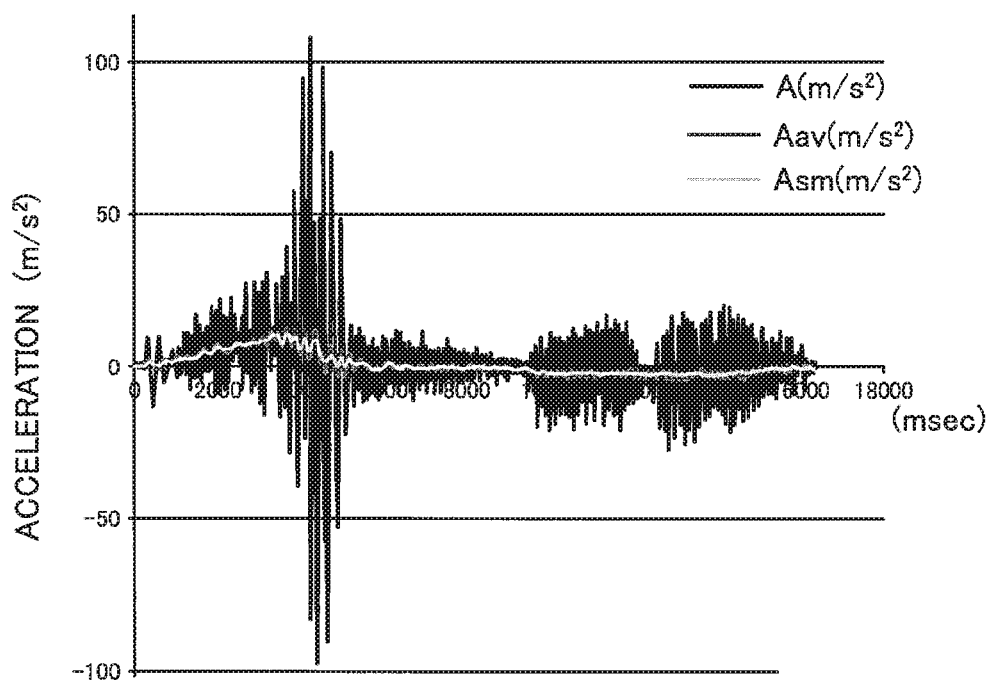
FIG. 5 is a diagram illustrating comparison among acceleration A, acceleration Aav calculated by differentiating the arithmetic mean speed Vlpfav, and time constant acceleration Asm as a result of the time constant processing on the acceleration Aav.

FIG. 5 is a diagram illustrating comparison among the acceleration A, the acceleration Aav calculated by differentiating the arithmetic mean speed Vlpfav, and the time constant acceleration Asm as a result of the time constant processing on the acceleration Aav. In FIG. 5, the vertical axis represents acceleration and the horizontal axis represents the measurement time. The acceleration A is a value calculated by differentiating the speed V, and is illustrated in the column 7 in FIG. 3. The time constant acceleration Asm and the acceleration Aav, calculated by using the arithmetic mean speed Vlpfav, involves smaller noise than the acceleration A. A signal may include noise at a predetermined interval, that is, sine wave noise. In such a case, the signal may be extracted at even number points at an interval that is half of the interval of the noise. This results in positive and negative noise amplitude values that are approximately the same (positive and negative noise amplitude values with approximately the same absolute value). Thus, a small arithmetic mean value is obtained, whereby the noise component can be substantially removed or reduced from the signal. It has been found that a rising phase of the acceleration Aav, calculated by differentiating the arithmetic mean speed Vlpfav, and a rising phase of the acceleration A, calculated by differentiating the speed V, substantially match.

Figure 6:
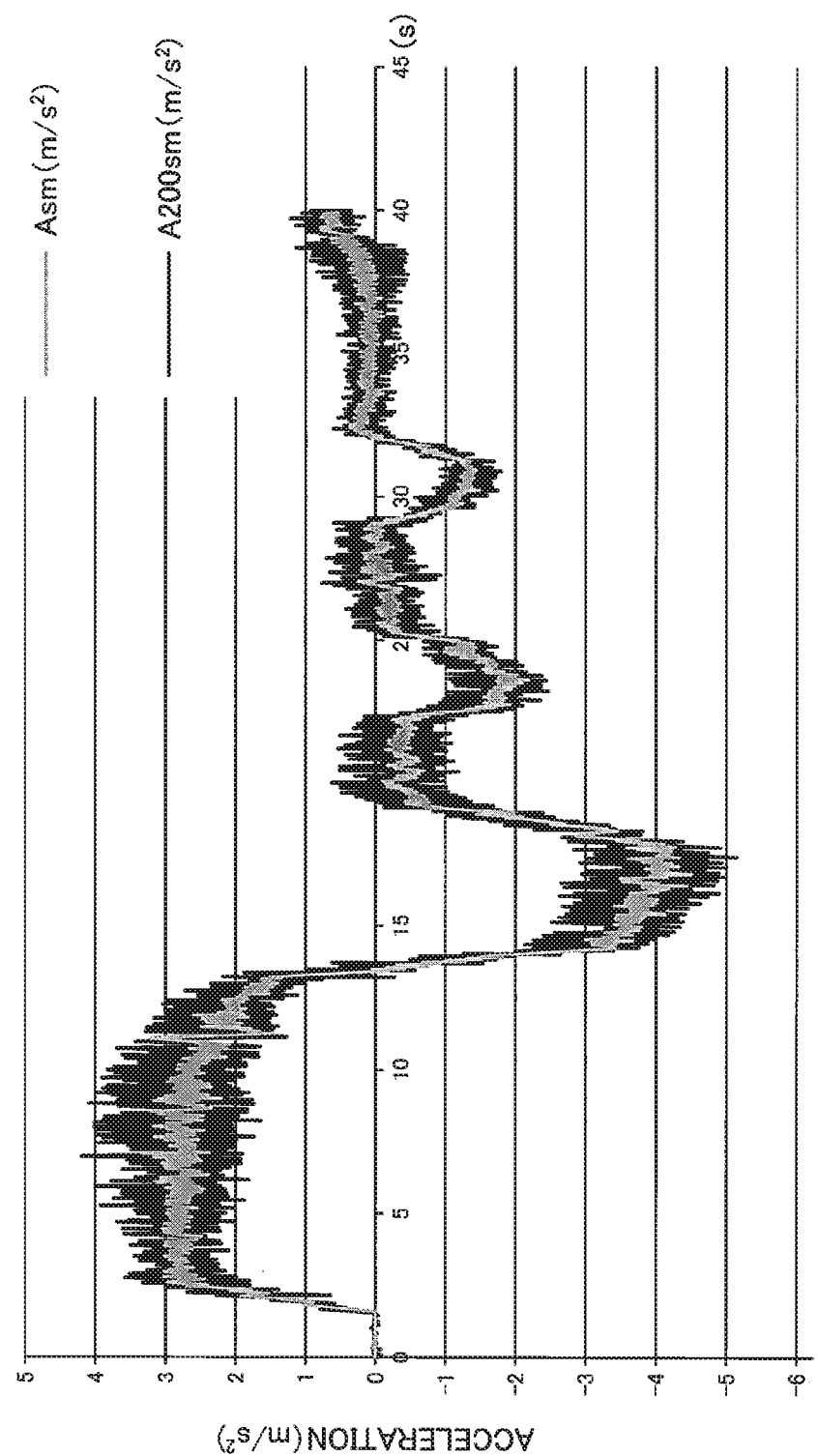
FIG. 6 is a diagram illustrating a value of a time constant and a phase difference.
Figure 7:
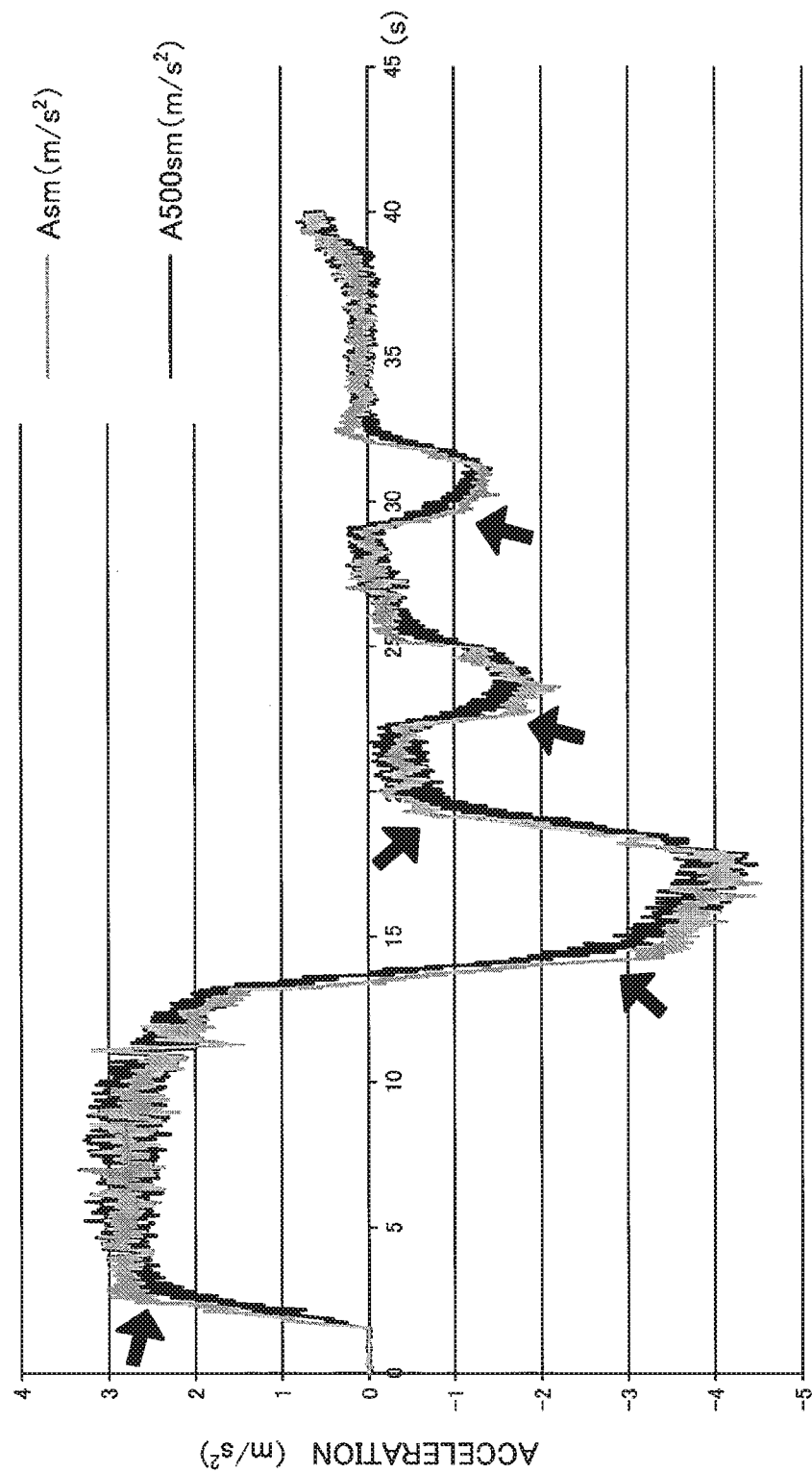
FIG. 7 is another diagram illustrating the value of the time constant and the phase difference.

FIG. 6 and FIG. 7 are diagrams illustrating a value of the time constant and a phase difference. FIG. 6 illustrates the time constant acceleration Asm based on the acceleration Aav calculated from the arithmetic mean speed Vlpfav with the time constant set to be 60 (ms) and acceleration A200sm calculated from the time constant speed Vsm with the time constant set to be 200 (ms). The acceleration A200sm is obtained through processing not involving the extraction processing or the arithmetic mean processing. FIG. 7 illustrates the time constant acceleration Asm based on the acceleration Aav calculated from the arithmetic mean speed Vlpfav with the time constant set to be 60 (ms) and acceleration A500sm calculated from the time constant speed Vsm with the time constant set to be 500 ms. The acceleration A500sm is obtained through processing not involving the extraction processing or the arithmetic mean processing. It is apparent from the comparison between the acceleration A200sm and the acceleration A500sm, respectively in FIG. 6 and FIG. 7, that the acceleration A500sm involves smaller noise. This is because high frequency components can be smoothened with the time constant increased from 200 (ms) to 500 (ms). Thus, the time constant may be increased to simply remove the noise from a signal. However, increase in a time constant results in a delay in the rising phase of the acceleration. An arrow in FIG. 7 indicates a portion where the delay of the rising phase of the acceleration is significant. All things considered, it is difficult to detect the peak of a signal at the peak timing by simply increasing the time constant.

The signal processing method according to the second embodiment described above includes the time constant processing, whereby the noise can be more effectively reduced or removed, in addition to the effects that can be obtained by the signal processing method according to the first embodiment. With the signal processing method according to the second embodiment, the peak timing can be more accurately obtained, compared with cases where the arithmetic mean is simply calculated or where the time constant processing is simply executed.

The noise can be removed with the arithmetic mean value calculated for each group of signals as a result of the extraction processing. Thus, the time constant for executing the time constant processing can be set to be small.

In the embodiments described above, the extraction processing is executed at an interval that is substantially half of the noise interval, that is, a half interval. Alternatively, the extraction processing may be executed at an interval obtained by multiplying the half interval by an odd number such as three or five. The interval obtained by multiplying the half interval by a large odd number is affected by earlier data in time series. Considering these aspects, the odd multiplying number may be determined based on a required noise processing level.

When the detection signal from the resolver 25 includes a plurality of noise components at different noise intervals, the noise removal processing according to the embodiments described above may be repeated with the extraction processing executed at an interval that is half of each noise interval. When the processing time or the number of processing times for the detection signal is limited, a representative noise interval may be selected from a plurality of noise intervals, and the extraction processing may be executed at an interval that is approximately the half of the representative noise interval. The interval of the remaining noise may substantially reach the measurement sampling interval as a result of executing the extraction processing for a plurality of times. Then, an extraction interval that matches the sampling interval or is obtained as a result of a process with an integer multiple of the sampling interval, for example, a double to quadruple time constant may be employed.

Moving average processing may be executed on a group of extracted data pieces extracted as described above. In particular, when the detection signals include a plurality of noise intervals, the moving average processing may be further executed on the arithmetic mean obtained for each noise interval.

The noise removal processing including the extraction processing, at an interval that is half of the noise interval, according to the embodiments described above may be executed on a detection signal obtained at any stage. Specifically, for example, the processing may be executed on the detection signal obtained by the detection by the resolver 25 or may be executed on the detection signal after the differentiation processing. When the detection signal includes noise components at a plurality of different noise intervals, the noise removal processing may be executed at different stages for different noise intervals.

The signal processing method according to the present disclosure may be applied to the detection signal obtained by the resolver 25 provided to the motor 20 connected to the propeller shaft 30 in the vehicle 100. Thus, when the detection signal obtained by the resolver 25 sharply changes, the peak timing can be obtained without delay with the noise due to the torsion of the propeller shaft removed. The signal processing method according to the present disclosure may be applied to the detection signal obtained by the resolver 25 provided to the motor 20 connected to a gear unit including the differential gear 40 and the like in the vehicle 100. Thus, when the detection signal obtained by the resolver 25 sharply changes, the peak timing can be obtained without delay with the noise due to the backlash of the gear unit removed. This effect can be similarly obtained also when the gear unit, connected to the motor 20, is a decelerator or a transmission employing gears. Thus, in the present embodiment, when the detection signal obtained by the resolver 25 sharply changes, the peak timing can be obtained without delay with the noise due to the torsion of the propeller shaft 30 removed and with the noise due to the backlash of the connection portion between the propeller shaft 30 and the differential gear 40 removed.

The acceleration output with the signal processing method described above may be applied to a slip detection method for detecting a slip of the vehicle 100. Thus, the controller 90 may be configured to detect whether a slip, between the rear wheel 60 of the vehicle 100 and the road surface, has occurred by using the acceleration calculated, that is, a second-order differential value of the rotational angle. For example, the controller 90 may detect the occurrence of a slip, when a threshold of a ratio for slip detection, stored in the memory 92 in advance, matches or is exceeded by a ratio between the acceleration of the vehicle body of the vehicle 100 detected with a known acceleration sensor or the like and the acceleration (the acceleration Aav and the time constant acceleration Asm) of the rear wheel 60 calculated. The acceleration calculated by processing the detection signal obtained by the resolver 25 has had the noise removed and involves no phase difference. Thus, with the acceleration, a slip of the vehicle 100 that has occurred can be detected without delay.

The controller 90 may control the vehicle 100 by using the signal processing method according to the present application. For example, when the occurrence of a slip is detected, the controller 90 may be configured to reduce a required amount of torque provided by the motor 20 to cancel the slip. Thus, the slip occurred in the vehicle 100 can be canceled without delay.

The vehicle 100 may be any type of vehicle with a sensor provided to a driving system. For example, the vehicle 100 may be a vehicle including a fuel cell system. The fuel cell system includes a fuel cell that generates power by using reaction gas, and is included in the driving system of the vehicle 100. The vehicle 100 may be a connected car. The connected car is an automobile that includes a communication device and can receive services by communicating with a cloud. For example, when the vehicle 100 is a connected car, the noise interval, the sampling interval, the threshold for the slip detection, and the like may be acquired through the communications. Then, each processing described above may be executed based on the information thus acquired and a signal as a detection by a sensor. With this configuration, when the signal sharply changes, the peak of the changed signal can be detected without delay with detection of a signal from the driving system of the vehicle 100 and noise removal simultaneously performed.

For example, the vehicle 100 may be a freight car or a heavy vehicle (LDV/HDT). Freight cars and heavy vehicles have a relatively long propeller shaft 30, and involve a relatively large backlash. Thus, the detection signal obtained by the resolver 25, provided to the motor 20 of a freight car or a heavy vehicle, is largely affected by noise. Thus, the noise removal through the signal processing method described above is effective for such a vehicle 100.

The signal processing method according to the present disclosure is not limited to the detection signal obtained by the resolver 25, and may be applied to any signal including noise at a constant interval. For example, a power converter, which raises output voltage of a fuel cell or the like up to high voltage to be usable in an inverter, provides a current value or a voltage value involving noise at a constant interval due to switching of an Insulated Gate Bipolar Transistor (IGBT). Thus, the signal processing method according to the present disclosure may be executed for processing such a current value or a voltage value. In such a case, the controller 90 may execute processing including: receiving signals as a result of the detection by a current sensor or a voltage sensor and sampling the received signals at an interval shorter than an interval of noise; extracting a plurality of the signals, sampled at the interval shorter than the interval of the noise, at an interval that is half of the interval of the noise; calculating an arithmetic mean value for a group of the extracted signals; and outputting a current value or a voltage value, obtained by the arithmetic mean processing, as a new signal. For example, the controller 90 may differentiate the current value or the voltage value obtained by the arithmetic mean processing, to detect irregular frequency components, different from the noise at a constant interval, in the signal obtained by the detection by the current sensor or the voltage sensor. With this configuration, when the signal includes an irregular frequency component, the irregular frequency component can be acquired without delay from the timing when the frequency component is generated. The controller 90 may be configured to control components of the fuel cell system based on the frequency component thus detected.

The present disclosure is not limited to the embodiments described above, and may be implemented in various ways without departing from the gist of the present disclosure. For example, the technical features in the embodiments are replaced or combined as appropriate in order to partially or entirely solve the problem described above or to partially or entirely achieve the advantageous effects described above. The components in the above described embodiments other than those described in the independent claims are additional elements that may be omitted as appropriate. The present disclosure may be implemented by aspects described below.

(1) According to an aspect of the present disclosure, a method of processing a signal including noise at a constant interval is provided. The method comprises receiving a signal as a result of detection by a sensor and sampling the received signal at an interval shorter than the interval of the noise; extracting a plurality of the sampled signals at an interval that is half of the interval of the noise; calculating an arithmetic mean value on a group of the extracted signals; and outputting a new signal being generated with the arithmetic mean value.

With this method, a plurality of signals sampled at an interval shorter than the interval of the noise are extracted at an interval that is half of the interval of the noise, and the arithmetic mean processing is executed on the signals. Thus, when the signal suddenly changes, the peak of the signal that has changed can be detected without delay, while simultaneously implementing detection of the signal by the sensor and noise removal.

(2) In the above-described aspect, the new signal may be used to detect an irregular frequency component, wherein the irregular frequency component is potentially included in the signals as a result of the detection by the sensor, wherein the irregular frequency component is different from the noise.

With this method, an irregular frequency component that has been generated in a signal can be detected without delay.

(3) In the above-described aspect, the sensor may be provided to a drive system of a vehicle.

With this method, when the signal suddenly changes, the peak of the signal that has changed can be detected without delay, while simultaneously implementing detection of the signal from the driving system of the vehicle and noise removal.

(4) In the above-described aspect, the signal as a result of the detection by the sensor may be a signal as a result of detection by the sensor detecting a rotational angle of a motor connected to a propeller shaft of the vehicle, and the new signal may be a second-order differential value of the rotational angle of the motor.

With this method, when the signal suddenly changes, the peak of the signal that has changed can be detected without delay, while removing noise due to torsion of the propeller shaft.

(5) In the above-described aspect, the signal as a result of the detection by the sensor may be a signal as a result of detection by the sensor detecting a rotational angle of a motor connected to a gear unit of the vehicle, and the new signal may be a second-order differential value of the rotational angle of the motor.

With this method, when the signal suddenly changes, the peak of the signal that has changed can be detected without delay, while removing noise due to backlash of the gear unit.

(6) In the above-described aspect, the extracting a plurality of the signals, sampled at the interval shorter than the interval of the noise, at the interval that is half of the interval of the noise may include extracting a plurality of groups of the signals extracted at the interval that is half of the interval of the noise, in such a manner that detection time of the sensor associated with each signal in each of the extracted groups is shifted from detection time of the sensor associated with a corresponding one of the signals in a previously extracted one of the groups.

With this method, a plurality of groups can be extracted.

(7) Occurrence of slip of the vehicle may be detected by using the second-order differential value obtained by the method according to the above-described aspect.

With this method, an occurrence of a slip of a vehicle can be detected without delay.

(8) A control method for a vehicle, the control method using the slip detection method according to the above-described aspect to control the vehicle, may comprise reducing an amount of torque required to be generated by the motor when the occurrence of the slip of the vehicle is detected.

With this method, a slip of a vehicle that has occurred can be cancelled without delay.

(9) According to another aspect of the present disclosure, a controller for a vehicle is provided. The controller may be configured to: receive a signal as a result of detection by the sensor detecting a rotational angle of the motor in the vehicle, wherein the received signal include noise at a constant interval, and sample the received signal at an interval shorter than the interval of the noise; extract a plurality of the sampled signals at an interval that is half of the interval of the noise; calculate an arithmetic mean value on a group of the extracted signals; output a new signal being generated with the arithmetic mean value, wherein the new signal is a second-order differential value of the rotational angle; detect occurrence of slip of the vehicle by using the second-order differential value; and reduce an amount of torque required to be generated by the motor when the occurrence of the slip of the vehicle is detected.

With this controller, a slip of a vehicle that has occurred can be canceled without delay.

What is claimed is:

1. A method of processing a signal including noise at a constant interval, the method comprising:
   receiving a signal as a result of detection by a sensor and sampling the received signal at an interval shorter than the interval of the noise;
   extracting a plurality of the sampled signals at an interval that is half of the interval of the noise;
   calculating an arithmetic mean value on a group of the extracted signals; and
   outputting a new signal being generated with the arithmetic mean value.

2. The method according to claim 1,
   wherein the new signal is used to detect an irregular frequency component, wherein the irregular frequency component is potentially included in the signals as a result of the detection by the sensor, wherein the irregular frequency component is different from the noise.

3. The method according to claim 1,
   wherein the sensor is provided to a drive system of a vehicle.

4. The method according to claim 3, wherein
   the signal as a result of the detection by the sensor is a signal as a result of detection by the sensor detecting a rotational angle of a motor connected to a propeller shaft of the vehicle, and
   the new signal is a second-order differential value of the rotational angle of the motor.

5. The method according to claim 3, wherein
   the signal as a result of the detection by the sensor is a signal as a result of detection by the sensor detecting a rotational angle of a motor connected to a gear unit of the vehicle, and
   the new signal is a second-order differential value of the rotational angle of the motor.

6. The method according to claim 1,
   the extracting a plurality of the signals, sampled at the interval shorter than the interval of the noise, at the interval that is half of the interval of the noise includes extracting a plurality of groups of the signals extracted at the interval that is half of the interval of the noise, in such a manner that detection time of the sensor associated with each signal in each of the extracted groups is shifted from detection time of the sensor associated with a corresponding one of the signals in a previously extracted one of the groups.

7. A slip detection method comprising detecting occurrence of a slip of a vehicle by using a second-order differential value obtained by a method of processing a signal including noise at a constant interval, wherein
   the method of processing the signal comprises
      receiving a signal as a result of detection by a sensor and sampling the received signal at an interval shorter than the interval of the noise;
      extracting a plurality of the sampled signals at an interval that is half of the interval of the noise;
      calculating an arithmetic mean value on a group of the extracted signals; and
      outputting a new signal being generated with the arithmetic mean value,
   the sensor is provided to a drive system of the vehicle,
   the signal as a result of the detection by the sensor is a signal as a result of detection by the sensor detecting a rotational angle of a motor connected to a propeller shaft of the vehicle, and
   the new signal is a second-order differential value of the rotational angle of the motor.

8. A slip detection method comprising detecting occurrence of a slip of a vehicle by using a second-order differential value obtained by a method of processing a signal including noise at a constant interval, wherein
   the method of processing the signal comprises
      receiving a signal as a result of detection by a sensor and sampling the received signal at an interval shorter than the interval of the noise;
      extracting a plurality of the sampled signals at an interval that is half of the interval of the noise;
      calculating an arithmetic mean value on a group of the extracted signals; and
      outputting a new signal being generated with the arithmetic mean value,
   the sensor is provided to a drive system of the vehicle,
   the signal as a result of the detection by the sensor is a signal as a result of detection by the sensor detecting a rotational angle of a motor connected to a gear unit of the vehicle, and
   the new signal is a second-order differential value of the rotational angle of the motor.

9. A control method for a vehicle, the control method using a slip detection method to control the vehicle,
   the control method comprising reducing an amount of torque required to be generated by a motor when an occurrence of a slip of the vehicle is detected, wherein
   the slip detection method comprises detecting occurrence of the slip of the vehicle by using a second-order differential value obtained by a method of processing a signal including noise at a constant interval,
   the method of processing the signal comprises
      receiving a signal as a result of detection by a sensor and sampling the received signal at an interval shorter than the interval of the noise;
      extracting a plurality of the sampled signals at an interval that is half of the interval of the noise;
      calculating an arithmetic mean value on a group of the extracted signals; and
      outputting a new signal being generated with the arithmetic mean value,
   the sensor is provided to a drive system of the vehicle,
   the signal as a result of the detection by the sensor is a signal as a result of detection by the sensor detecting a rotational angle of a motor connected to a propeller shaft of the vehicle, and
   the new signal is a second-order differential value of the rotational angle of the motor.

10. A control method for a vehicle, the control method using a slip detection method to control the vehicle,
    the control method comprising reducing an amount of torque required to be generated by a motor when the occurrence of a slip of the vehicle is detected, wherein
    the slip detection method comprises detecting occurrence of the slip of the vehicle by using a second-order differential value obtained by a method of processing a signal including noise at a constant interval,
    the method of processing the signal comprises
       receiving a signal as a result of detection by a sensor and sampling the received signal at an interval shorter than the interval of the noise;

extracting a plurality of the sampled signals at an interval that is half of the interval of the noise;

calculating an arithmetic mean value on a group of the extracted signals; and outputting a new signal being generated with the arithmetic mean value, the sensor is provided to a drive system of the vehicle, the signal as a result of the detection by the sensor is a signal as a result of detection by the sensor detecting a rotational angle of a motor connected to a gear unit of the vehicle, and the new signal is a second-order differential value of the rotational angle of the motor.

11. A controller for a vehicle, the controller being configured to:

receive a signal as a result of detection by a sensor detecting a rotational angle of a motor in the vehicle, wherein the received signal include noise at a constant interval, and sample the received signal at an interval shorter than the interval of the noise;

extract a plurality of the sampled signals at an interval that is half of the interval of the noise;

calculate an arithmetic mean value on a group of the extracted signals;

output a new signal being generated with the arithmetic mean value, wherein the new signal is a second-order differential value of the rotational angle;

detect occurrence of slip of the vehicle by using the second-order differential value; and reduce an amount of torque required to be generated by the motor when the occurrence of the slip of the vehicle is detected.

12. A vehicle comprising a controller for a vehicle, wherein the controller is configured to:

receive a signal as a result of detection by a sensor detecting a rotational angle of a motor in the vehicle, wherein the received signal include noise at a constant interval, and sample the received signal at an interval shorter than the interval of the noise;

extract a plurality of the sampled signals at an interval that is half of the interval of the noise;

calculate an arithmetic mean value on a group of the extracted signals;

output a new signal being generated with the arithmetic mean value, wherein the new signal is a second-order differential value of the rotational angle;

detect occurrence of slip of the vehicle by using the second-order differential value; and reduce an amount of torque required to be generated by the motor when the occurrence of the slip of the vehicle is detected.

* * * * *